United States Patent [19]

Elleaume

[11] Patent Number: 4,723,125
[45] Date of Patent: Feb. 2, 1988

[54] DEVICE FOR CALCULATING A DISCRETE MOVING WINDOW TRANSFORM AND APPLICATION THEREOF TO A RADAR SYSTEM

[75] Inventor: Philippe Elleaume, Antony, France
[73] Assignee: Thomson-CSF, Paris, France
[21] Appl. No.: 878,891
[22] Filed: Jun. 26, 1986

[30] Foreign Application Priority Data

Jun. 28, 1985 [FR] France ............... 85 09896

[51] Int. Cl.$^4$ ............................................. G01S 7/44
[52] U.S. Cl. ................................ 342/194; 342/196; 364/726
[58] Field of Search ............... 342/194, 196, 201; 364/726

[56] References Cited

U.S. PATENT DOCUMENTS

| | | |
|---|---|---|
| 3,778,606 | 12/1973 | Schmitt et al. . |
| 4,058,715 | 11/1977 | Niwa .................... 364/726 |
| 4,093,994 | 6/1978 | Nussbaumer .............. 364/726 |
| 4,234,880 | 11/1980 | Klemm ................. 342/196 X |
| 4,462,032 | 7/1984 | Martin ................. 342/196 X |
| 4,566,011 | 1/1986 | Lewis et al. ............ 342/196 X |

OTHER PUBLICATIONS

Dillard, G., "Recursive Computation of the Discrete Fourier Transform with Applications to an FSK Communication Receiver," IEEE National Telecommunication Conference, San Diego, Dec. 2–4, 1974, pp. 263–265.

Primary Examiner—T. H. Tubbesing
Attorney, Agent, or Firm—Pollock, VandeSande & Priddy

[57] ABSTRACT

A device for calculating a discrete moving window Fourier transform. It comprises an assembly of circuits receiving samples of the input signal ($E_{m+n}$), the output signal of this assembly ($\delta_m$) being applied to a plurality of N identical and parallel stages ($E_k$). The assembly of circuits comprises a shift register conferring a delay of N sampling periods on the incident signal and an adder performing the subtraction:

$$\delta_m = x_{m+N} - X_m$$

of the input and output signals of the shift register. Each of the N stages delivers a signal in the form:

$$x_k^{m+1} = X_k^m + m\delta . e^{j2\pi k/N}.$$

7 Claims, 6 Drawing Figures

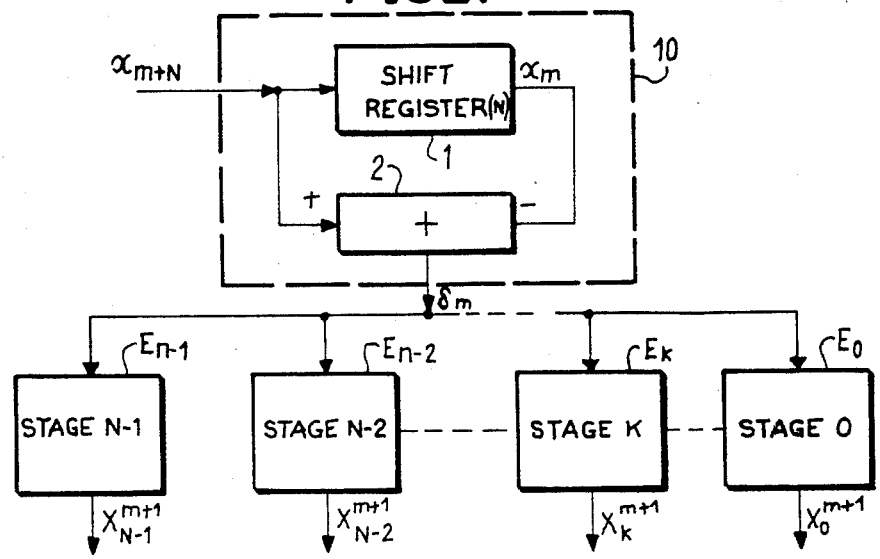
FIG_1
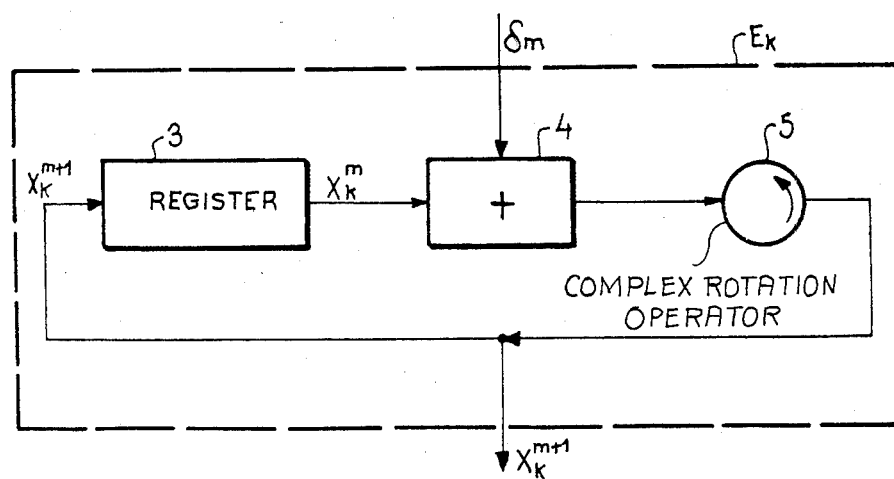
FIG_2

FIG_3
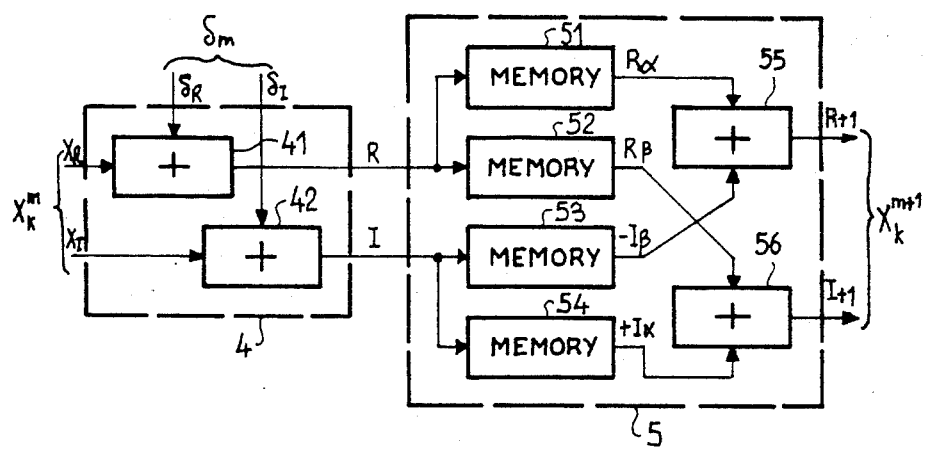
FIG_4
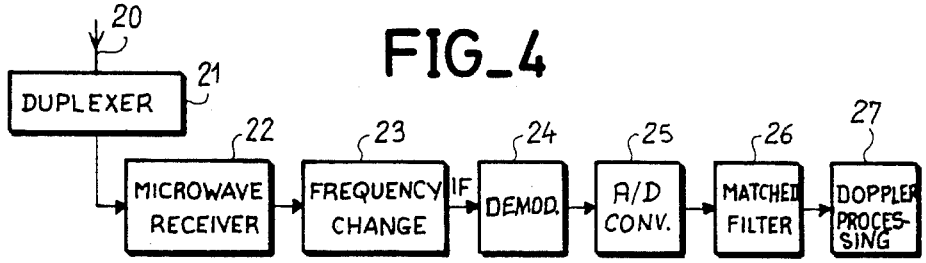
FIG_5
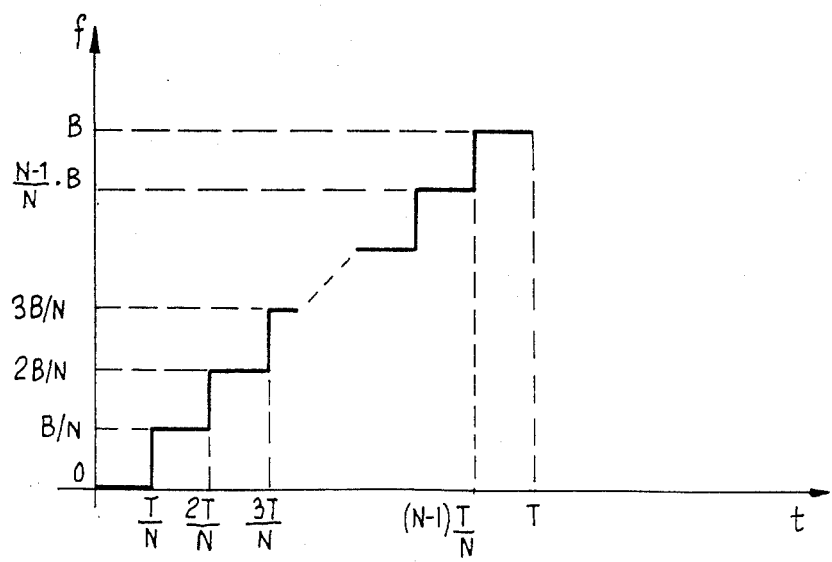

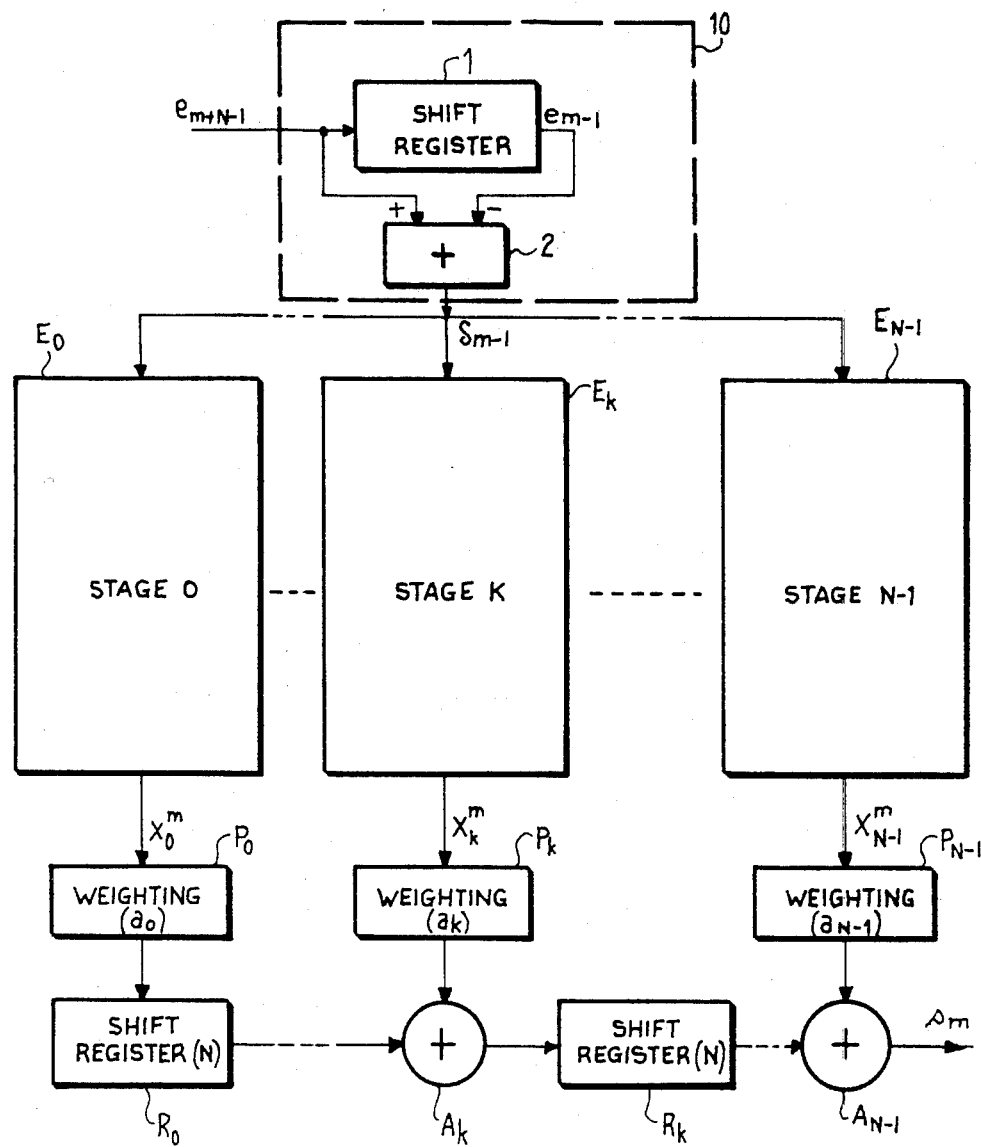
FIG_6

DEVICE FOR CALCULATING A DISCRETE MOVING WINDOW TRANSFORM AND APPLICATION THEREOF TO A RADAR SYSTEM

BACKGROUND OF THE INVENTION

The present invention relates to a device for calculating a discrete moving window Fourier transform, that is to say a discrete Fourier transform (DFT) applied to a signal through a window moving or sliding in time. The invention also relates to the application of this calculating device to a radar system.

As is known, numerous applications use calculation of the Fourier transform and, among them is, the filtering operations which are performed in a radar system on the received signal. Furthermore, present technical and technological developments lead more and more to searching for digital solutions for this processing. In this search, one of the difficulties is the required calculating power. This problem is particularly acute in applications such as radar systems where the calculations must be made in real time.

The present invention provides a device for calculating a discrete Fourier transform, in a moving time window, for reducing the number of operations needed.

Accordingly, an object of the invention is to provide a device comprising an assembly of circuits receiving samples ($x_m$) of the input signal, the output signal of the assembly being applied to one or more identical stages (N). The preceding assembly of circuits comprises a circuit, a shift register for example, conferring a delay of N sampling periods on the incident signal and an adder, performing the subtraction:

$$\delta_m = x_{m+N} - x_M \quad (1)$$

of the input and output signals of the shift register. Each of the stages delivers a signal $X_k^{m+1}$ of the form:

$$X_k^{m+1} = (X_k^m + \delta_m) \cdot \exp\{j.2\pi.(k/N)\} \quad (2)$$

where k is the index of the stage ($0 \leq k < N$).

A further object of the invention is to provide an application of this device to pulse compression in a radar signal processing chain.

BRIEF DESCRIPTION OF THE DRAWINGS

Other objects, features and results of the invention will be clear from the following description given by way of non limitative example and with reference to the accompanying drawings which show:

FIG. 1, the block diagram of the calculating device of the invention;

FIG. 2, the diagram of a part of the preceding Figure;

FIG. 3, one embodiment of some elements of the preceding Figure;

FIG. 4, the block diagram of a radar receiver and the signal processing chain relative thereto;

FIG. 5, an explanatory diagram;

FIG. 6, the diagram of application of the device of the invention to pulse compression in the radar signal processing chain.

In the different Figures, the same references refer to the same elements.

DESCRIPTION OF THE PREFERRED EMBODIMENT

Before describing the Figures in detail showing the embodiment of the calculating device of the invention, a few reminders will be given hereafter concerning the discrete Fourier transform.

It will be recalled that, with the DFT, a set of N sequential components $X_k$, with k varying from 0 to $N-1$, can be caused to correspond to N samples of a signal x(t) varying in time. If we designate by $X_n$ the sample of order n ($0 \leq n \leq N-1$) of the signal x(t), with sampling carried out at a period $\tau$ and in a time window of duration T, with $T = T.\tau$, the correspondance is of the form:

$$X_k = \sum_{n=0}^{N-1} x_n \cdot \exp\left(-j \cdot 2\pi \frac{k \cdot n}{N}\right) \quad (3)$$

the reverse transform being written, as is known:

$$x_n = \sum_{k=0}^{N-1} X_k \cdot \exp\left(+j \cdot 2\pi \cdot \frac{k \cdot n}{N}\right) \quad (4)$$

When it is desired to apply such a Fourier transform to a signal x(t) in a time window of N points sliding in time, for a window of index m, the following expression is obtained for the components X:

$$X_k^m = \sum_{n=0}^{N-1} x_{m+n} \cdot \exp\left(-j \cdot 2\pi \cdot \frac{k \cdot n}{N}\right) \quad (5)$$

The calculation of these components requires numerous operations and, consequently, a considerable calculating power. As mentioned above, the problem arises all the more acutely since, in some applications such as radar systems, these calculations must be made in real time.

Calculations show that the operations required are partly redundant and a calculation algorithm can be found which minimizes the number of operations needed. This algorithm allows the term $X_k^{m+1}$ to be obtained from the sample $x_m$ of the signal and from the previously calculated term ($X_k^m$) in the following way:

$$X_k^{m+1} = (X_k^m + x_{m+N} - x_m) \cdot \exp(+j.2\pi.(k/N)) \quad (6)$$

In fact, starting with the expression (5) above and applying to a window moving over one sampling period (window of index m+1), we obtain:

$$X_k^{m+1} = \sum_{n=0}^{N-1} x_{m+1+n} \cdot \exp\left(-j \cdot 2\pi \cdot \frac{k \cdot n}{N}\right)$$

The following variable change is made:

$$n' = n+1$$

whence:

$$X_k^{m+1} = \sum_{n'=1}^{N} x_{m+n'} \cdot \exp\left(-j \cdot 2\pi \cdot \frac{k \cdot (n'-1)}{N}\right)$$

or else:

$$X_k^{m+1} = \left\{ \sum_{n'=1}^{N} x_{m+n'} \cdot \exp\left(-j \cdot 2\pi \cdot \frac{k \cdot n'}{N}\right) \right\} \cdot \exp\left(+j \cdot 2\pi \cdot \frac{k}{N}\right)$$

$$= \left\{ \sum_{n'=0}^{N-1} x_{m+n'} \cdot \exp\left(-j \cdot 2\pi \cdot \frac{k \cdot n'}{N}\right) - x_m \cdot \exp\left(-j \cdot 2\pi \cdot \frac{k \cdot 0}{N}\right) + x_{m+N} \cdot \exp\left(-j \cdot 2\pi \cdot \frac{k \cdot N}{N}\right) \right\} \cdot \exp\left(+j \cdot 2\pi \cdot \frac{k}{N}\right)$$

$$= (X_k^m + x_{m+N} - x_m) \cdot \exp\left(+j \cdot 2\pi \cdot \frac{k}{N}\right)$$

which is the above expression (6) and which may be further written:

$$X_k^{m+1} = (X_k^m + \delta_m) \cdot \exp(+j.2\pi.(k/N)),$$

which is the above expression (2), with:

$$\delta_m = x_{m+N} - x_m$$

(above expression (1)).

FIG. 1 shows the diagram of a device for calculating a moving window DFT in accordance with the above formulation (6).

In FIG. 1, we find a first assembly 10 of circuits receiving a sample $x_{m+N}$ of the signal x(t) on which it is desired to perform a Fourier transformation and outputting the quantity $\delta_m$ (above expression (1)). This quantity $\delta_m$ is delivered in parallel to N identical stages, referenced $E_O \ldots E_k \ldots E_{N-2}, E_{N-1}$, which in their turn deliver the desired quantity $X_k^{m+1}$.

The assembly 10 is common to the N stages because the expression $\delta_m$ is independent of the rank (k) of the stage. It is formed by means 1 conferring on the input signal $x_{m+N}$ a delay equal to N sampling periods. These delay means are formed preferably by a shift register with N stages. The output signal of register 1 is referenced $x_m$. The input signal and the output signal of register 1 are subtracted in an adder-subtractor 2 for giving the quantity $\delta_m$.

Such a calculating device may be used for example for performing the spectral analysis of the signal x(t) by delivering the N frequency components $X_k$ thereof.

It should be noted that such a device may comprise only a single stage. A practical application thereof is for example the construction of a filter adapted to a whole number of periods of a sinusoid of given frequency as explained hereinbelow.

It should also be noted that during initialization of the device, when the first sample ($x_0$) is received, all the operators and registers must be at zero.

FIG. 2 shows schematically the construction of one of the stages of the device of FIG. 1, for example stage $E_k$.

Stage $E_k$ comprises an adder 4, which receives at one of its inputs the quantity $\delta_m$ delivered by the preceding assembly 10 and at the other of its inputs the previously calculated quantity $X_k^m$, and which addresses the result of the addition to a complex rotation operator 5. This latter multiplies the result of the addition by the quantity exp (+j.2π.(k/n)) from the expression (6). The output of the operator 5, $X_k^{m+1}$, forms the output quantity of stage $E_k$. It is further applied to the input of a memory device 3, such as a register, for storing the result of the calculations so as to deliver to the next step, where $X_k^{m+2}$ will be calculated, the previously elaborated quantity.

It should be noted that in the different Figures (except for FIG. 4), the data supplied to the operators and delivered thereby are complex numbers, expressed in real part-imaginary part form, these two parts being transmitted in series or in parallel depending on the desired performances.

FIG. 3 shows one embodiment of the operators 4 and 5 of FIG. 2.

The input data $\delta_m$ and $X_k^m$ of the adder operator 4 are represented separately by their real and imaginary parts, respectively $\delta_R$ and $\delta_I$ for $\delta_m$, $X_R$ and $X_I$ for $X_k^m$.

Adder 4 comprises two elementary adders 41 and 42 working out the addition respectively of the real parts and of the imaginary parts of the data $\delta_m$ and $X_k^m$. The results of the additions are shown respectively as R and I and are directed towards the complex rotation operator 5.

As is known, performing a complex rotation exp (j.2π.(k/N)) on a complex quantity R+jI is tantamount to working out the product:

$$(R+jI).(\alpha+j\beta)$$

if $\alpha$ and $\beta$ are the real and imaginary parts of the expression exp (j.2π.(k/n)). The development of the product shows that it is equivalent to:

$$(R\alpha - I\beta) + j(R\beta + I\alpha)$$

In FIG. 3, the operator 5 has been shown performing this last operation. It comprises four memories 51-54, for example of the ROM type, the first two receiving the data R and the last two the data I. These memories deliver the quantities Rα, Rβ, −Iβ and Iα, respectively. The first and third of these data are added in an adder 55 for forming the real part of the quantities $X_k^{m+1}$. The second and fourth data are added in an adder 56 for forming the imaginary part of the quantities $X_k^{m+1}$.

In an alternate embodiment, only two memories and one adder are used. Upon external control, the memories give the quantities Rα and −Iβ in a first step. These quantities are added to form the real part R+1. In a second step, the memories give the two other quantities (Rβ and Iα) which are added to form the imaginary part I+1.

It must be noted that the described embodiment does not need any multiplier. Of course, other embodiments are possible, which may or many not use a multiplier.

As was mentioned above, a calculation device such as the one shown in FIG. 1 may be used in a radar processing chain for forming a matched filter.

It will be recalled that the optimum processing which may be applied to a signal in noise is to cause it to pass through a filter "matched" to the signal, that is to say a filter whose transmittance is the conjugate of the spectrum of said signal.

It will be recalled that the purpose of pulse compression technique is to improve the distance resolution power of a radar, while allowing a large duration T for the pulse. This process consists in disposing a dispersive line in the transmission chain of the radar, which results in lengthening or expanding the signal and compensating for this effect on reception, that is to say by compressing the received signal. In practice, for reasons of resistance to the Doppler effect, for providing the "expanded" signal, a frequency ramp is often chosen, that is to say a linear frequency modulation. The problem which then arises on reception is to construct a filter which is adapted to the frequency ramp in question. This is the problem which is considered hereafter.

When digital techniques are used, an approximation of the frequency ramp may be used so as to facilitate the subsequently performed matched filtering operation. One form of such an approximation is known as Frank codes. It will be recalled that by "code" is meant a signal whose characteristics may vary in time. The coding may be deterministic or pseudo-random (established at the transmitter). It will also be recalled that the Frank approximation is written:

$$x(t) = \exp(j.2\pi f(t).t) \quad (11)$$

where:
- $t \in [0; T[$;
- $f \in [0; B[$ and $f(t) = (k(t)/N).B$;
- B is the frequency bandwidth of the signal x(t).

The signal x(t) appears then as is shown in FIG. 5: a series of N staircase steps extending in time for a duration T. Each step, or level, of order i is characterized by a frequency iB/N and a duration T/N.

Using the preceding notations the following are chosen:

$$BT = N^2$$

$$f_e = B \longleftrightarrow \tau = 1/B,$$

which leads to having an integer number of complex sinusoids per level and the different levels are therefore joined together without phase jump. Furthermore, having N levels, we have N samples per level.

It is known to perform the matched filtering of the Frank codes using fast Fourier transform (FFT) algorithms by assuming $N = 2^q$, which leads to:

$$B.T = (2^q)^2 \quad (12)$$

In fact, the FFT algorithms are more particularly adapted to the powers of 2.

However, in this case, the number of compression ratios allowed is limited (it will be recalled that the compression ratio is given by the product B.T). For example, for an integer N chosen between 1 and 16, the only compression ratios allowed are 1, 4, 16, 64 and 256. This is a drawback mainly for the two following reasons:

the fact of being limited to a few precise values of the product BT is troublesome because the choice of each of the parameters B and T is not free: the duration T is conditioned by the desired power and range of the radar, whereas the bandwidth B is conditioned by the desired resolution;

the difference between the different possible compression ratios is very large for the high values of the product BT. Now, in some applications (multimode radars), it is desirable to vary these parameters more finely.

According to the invention, for providing a filter matched to each level, a moving window DFT is used such as defined by the expression (6) above. In fact, it is shown hereunder that the discrete moving window Fourier transform is the filter matched to a signal formed of an integer number of complex sinusoids.

Taking a signal x(t) formed of a whole number of complex sinusoids:

$$x(t) = \exp\{+j.2\pi f.t\}$$

with:
- $t \in [0; T[$
- $f = k.1/T$

If we choose a sampling frequency $f_e$ such that:

$$f_e = N.(1/T) \text{(with } N > k_{max}\text{)},$$

the sampled signal x'(t) may be written in the form:

$$x'(t) = \sum_{n=0}^{N-1} x_n \cdot \delta(t - n\tau) \quad (7)$$

where:
- $\delta$ is the Dirac function
- $\tau$ is the sampling period $(1/f_e)$
- $x_n$ is the signal x(t) sampled at the nth sampling period $(\tau)$:

$$x_n = \exp(j \cdot 2\pi \cdot f \cdot n \cdot \tau) \quad (8)$$

$$= \exp\left(j \cdot 2\pi \cdot \frac{k \cdot n}{N}\right)$$

The transmittance H(f) of the filter adapted to the sampled signal x'(t) is the conjugate complex of the spectrum X'(f) of this signal:

$$H(f) = \overline{X'(f)}$$

or, in the time domain $$h(t) = \overline{x'(-t)}, \quad (9)$$

h(t) being the Fourier transform of the transmittance H(f).

From expression (7), (8) and (9), is derived:

$$h(t) = \sum_{n=0}^{N-1} \exp\left(-j \cdot 2\pi \frac{k \cdot n}{N}\right) \cdot \delta(-t - n\tau) \quad (10)$$

If we apply a signal e(t) to a filter whose response is given by the expression (10), we obtain at the output of the filter a signal s(t) defined by:

$$s(t) = h(t) * e(t)$$

where the sign ✳ represents a convolution product, that is to say:

$$s(t) = \int_{-\infty}^{+\infty} e(t-u) \cdot h(u) \cdot du$$

By replacing in this last expression $h(u)$ by its value given by the expression (10) we obtain:

$$s(t) = \sum_{n=0}^{N-1} \left\{ \int_{-\infty}^{+\infty} e(t-u) \cdot \delta(-u-n\tau) \cdot du \right\} \cdot \exp\left(-j \cdot 2\pi \cdot \frac{k \cdot n}{N}\right)$$

$$= \sum_{n=0}^{N-1} e(t+n\tau) \cdot \exp\left(-j \cdot 2\pi \cdot \frac{k \cdot n}{N}\right)$$

If we only consider the output signal after sampling, that is to say $s(m\tau)$, referenced $s_m$:

$$s_m = \sum_{n=0}^{N-1} e_{m+n} \cdot \exp\left(-j \cdot 2\pi \cdot \frac{k \cdot n}{N}\right)$$

This expression is of the same form as the above expression (5), that is to say that the output signal (s) is obtained by performing a moving window DFT on the input signal (e).

According to the invention, pulse compression is therefore performed in a radar chain using the device shown in FIG. 1.

FIG. 4 diagrammatically shows a reception and processing chain for a radar signal using pulse compression techniques, in which the device according to the invention may be embodied.

The radar signal is received on an antenna 20 and is directed through a duplexer 21 to the receiver part of the radar.

This receiver part comprises mainly, in cascade:
a microwave receiver 22;
an assembly 23 of frequency change circuits ensuring the transposition of the microwave signal received into an intermediate frequency signal (IF);
a phase and amplitude demodulation device (DAP);
an analog-digital converter (ADC) 25 for digitizing the radar signal;
a matched filter 26;
an assembly 27 of circuits providing, if required, Doppler processing.

It should be noted that the matched filter 26 may be possibly placed after the Doppler processing circuits 27. In the same connection, when demodulator 24 is formed digitally, it may be positioned elsewhere in the chain, of course after the converter 25.

According to the invention, the matched filter 26 is formed by a device for calculating a moving window DFT as defined by formula (6) above, when the transmitted signal is a linear frequency ramp in which the product BT is equal to the square of an integer ($N^2$), the advantage of this structure being the liberty in the choice of N.

FIG. 6 shows an embodiment of this filter.

In this Figure, we find again the assembly 10, formed in the same way as in FIG. 1, common to N stages $E_O \ldots E_k \ldots E_{N-1}$. Assembly 10 receives, as input signal, the sample $e_{m+N-1}$ and delivers the quantity $\delta_{m-1}$. The stage $E_k$ (of rank k) delivers at its output the quantity $X_k^m$. Each of the quantities $X_k^m$ is summed (adder $A_k$) with a preceding quantity ($X_{k-1}^m$) after having undergone a delay $R_k$ equal to N sampling periods. Circuit $R_k$ is formed for example from a shift register with N stages. The summation is performed as far as the last stage ($E_{N-1}$) so as to produce the output signal $s_m$.

The insertion of a delay N at the level of each stage is made necessary by the fact that with the system shown in FIG. 6, the first point of each of the N levels is calculated simultaneously, which are separated from each other by N sampling periods. In order to obtain the signal $s_m$, it is therefore necessary to make a correction. Of course, this correction is only required in the case where the N levels are emitted successively. If they are emitted simultaneously, the delays $R_k$ are no longer useful.

Furthermore, in the embodiment shown in FIG. 6, a weighting device $P_k$ is interposed between the output of the stage $E_k$ and adder $A_k$. It is a question of optional amplitude weighting, the purpose of which is to lower the level of the secondary lobes; however, it generates losses because then we deviate from the theoretical matched filter.

What is claimed is:

1. A device for calculating a discrete sliding Fourier transform in a time window of duration T, delivering at least one component ($X_k^{m+1}$) of said transform from N samples ($x_{m+N}$) of an input signal whose transform it is desired to calculate; said device comprising:
   first means receiving the samples and including addition-subtraction means for computing $\delta_m = x_{m+n} - x_m$;
   at least one stage receiving the quantity $\delta_m$ and deriving at an output the component:

$$X_k^{m+1} = (X_k^m + \delta_m) \cdot \exp(j.2\pi.k/N)$$

where k is the stage index and m is the window index, the stage comprising second means adding the quantity $\delta_m$ to the component $X_k^m$ previously calculated by said at least one stage, and third means receiving an output of the second means and imposing thereon a complex rotation in accordance with the expression $\exp(j.2\pi.k/N)$, an output of said third means forming an output of said at least one stage.

2. A device as claimed in claim 1, including a plurality of N identical stages, connected in parallel.

3. A device as claimed in claim 2, wherein each of the outputs of the different stages are connected to delay means imposing different delays, the delay assigned to any said stage depending on the rank of the stage, outputs of all said stages being connected to addition means which give an output signal of the device.

4. A device as claimed in claim 1, wherein said first means further comprise delay means receiving as an input the samples ($x_{m+N}$) and conferring thereon a delay T to produce a delayed output, said addition-subtraction means computing a difference between the received input and the delayed output of said delay means, which forms the quantity $\delta_m$.

5. A device as claimed in claim 1, wherein each of said at least one stage further comprises means for storing the component $X_k^m$ which it has calculated.

6. In a radar receiver, a processing system for a digitized radar signal, the system comprising:
   a device for calculating a discrete sliding Fourier transform in a time window of duration T, delivering at least one component ($X_k^{m+1}$) of said transform from N samples ($x_{m+N}$) of an input signal whose transform it is desired to calculate; said device including
   (a) first means receiving the samples and including addition-subtraction means for computing $\delta_m = x_{m+n} - x_m$;
   (b) at least one stage receiving the quantity $\delta_m$ and deriving at an output the component:

$$X_k^{m+1} = (X_k^m + \delta_m).\exp(j.2\pi.k/N)$$

where k is the stage index and m is the window index, the stage comprising second means adding the quantity $\delta_m$ to the component $X_k^m$ previously calculated by said at least one stage, and third means receiving an output of the second means and imposing thereon a complex rotation in accordance with the expression $\exp(j.2\pi.k/N)$, an output of said third means forming an output of said at least one stage.

7. The radar receiving processing system set forth in claim 6 including a plurality of N identical stages, connected in parallel and further including:
   weighing means connected to the outputs of the stages for selectively weighing the amplitudes of the stage outputs.

* * * * *